United States Patent [19]
Harvey et al.

[11] Patent Number: 5,919,374
[45] Date of Patent: *Jul. 6, 1999

[54] METHOD OF DISINFECTING WATER WITH IODINE SPECIES

[75] Inventors: Wayne A. Harvey; Terence F. Mullins; Daniel J. MacDonald, all of Dartmouth, Canada

[73] Assignee: Iosolutions Incorporated, Nova Scotia, Canada

[*] Notice: This patent is subject to a terminal disclaimer.

[21] Appl. No.: 08/871,901

[22] Filed: Jun. 12, 1997

[51] Int. Cl.$^6$ ....................................................... C02F 1/76
[52] U.S. Cl. ........................ 210/753; 210/742; 210/764; 422/37
[58] Field of Search .................................. 210/753, 742, 210/764; 422/37

[56] References Cited

U.S. PATENT DOCUMENTS

| | | | |
|---|---|---|---|
| 4,059,522 | 11/1977 | Polley et al. ............................ | 210/753 |
| 4,367,149 | 1/1983 | Kinman . | |
| 5,480,564 | 1/1996 | Pope et al. ............................. | 210/766 |
| 5,552,057 | 9/1996 | Hughes et al. . | |

OTHER PUBLICATIONS

Berg et al: "Devitalization of Microorganisms by Iodine", Virology, 22, pp. 469–481 (1964).

Hsu et al: "Some Bactericidal and Virucidal Properties of Iodine Not Affecting Infectious RNA and DNA", Journal Of Epidemiology, vol. 82, No. 3, pp. 317–328 (1996).

Cramer et al: "Chlorination and Iodination of Poliovirous and $F_2$", Journal WPCF, vol. 48, No. 1, pp. 61–76, (1976).

Taylor et al: "A Comparison of the Virucidal Properties of Chlorine, Chlorine Dioxide, Bromine Chloride and Iodine", J.HYG. Camb., 89, pp. 321–328, (1982).

Alvarez et al: "Mechanisms of Inactivation of Poliovirus by Chlorine Dioxide and Iodine", Applied and Environmental Microbiology, vol. 44, No. 5, pp. 1064–1071, (1982).

*Primary Examiner*—Jay H. Woo
*Assistant Examiner*—Betsey J. Morrison
*Attorney, Agent, or Firm*—Pillsbury Madison & Sutro LLP

[57] ABSTRACT

A method and apparatus for producing bacteria-free iodine-species-containing drinking water for farm animals under continuous dynamic water flow, comprising dissolving solid iodine into a first water flow to produce a saturated iodine species-containing aqueous solution at a pre-selected temperature; blending the saturated solution with a second water flow to produce a diluted iodine species bacterium-free aqueous solution; and providing the diluted solution as drinking water to the animals. Preferably, the iodine is dissolved in the first water flow to provide a saturated iodine species at a pre-selected temperature at a known concentration, which saturated solution is then blended into a mean water flow. The continuous flow of iodine species-containing water is fed to a farm animal drinking water distribution network with reduced risk of back-contamination by bacteria-containing water through the network. Other uses of the iodinated water are as a disinfectant, for example, in the food processing industry; fruit, vegetable and fish preservation; industrial, commercial cooling tower waters, sewage and waste water treatment; and as a nutrient as an iodine source for humans, livestock, fish and plants.

20 Claims, 4 Drawing Sheets

METHOD OF DISINFECTING WATER WITH IODINE SPECIES

FIELD OF THE INVENTION

This invention relates to the treatment of water by iodine species, particularly the disinfection of water for use as a drinking source for farm animals, in agriculture, fisheries, the food industry, fruit and vegetable, industrial water treatment systems and pharmaceutical industries.

BACKGROUND TO THE INVENTION

Iodine has been used for water disinfection on a large scale in the past Iodine is used commonly also for its antibiotic (sensu stricto) effects against bacteria, viruses and cysts, as these three pathogens constitute the most common health risks in maintaining biologically safe water supplies. Traditionally, crystalline iodine is dissolved in water under static conditions by the addition of small amounts of KI, which greatly enhances the dissolution of the iodine.

Of particular interest in a drinking water context, are those bacteria responsible for widespread occurrences and recurrences of intestinal infections in humans, namely, the coliform family of bacteria, e.g., *E coli*. These bacteria commonly contaminate drinking water supplies when waste water containing faecal material spills into a water supply, or when excessive anaerobic decay of vegetation in the water supply occurs. In general, the actual inactivation mechanism of the pathogenicity of both bacteria, viruses and cysts by iodine is poorly understood.

To-date, iodine is generally provided from an iodophor source or as an aqueous solution by the use of KI to aid the dissolution of iodine. Most treatments employ pHs lower or higher than about 9.

Dissolved iodine hydrolyzes in aqueous solutions to form hypoiodous acid, HOI, in amounts proportional to the pH of the solution, wherein above pH 8.5, iodine is present almost exclusively as HOI. Both dissolved $I_2$ and HOI possess antipathogenic properties. At pHs 5–7, iodine, as $I_2$, exhibits antibacterial action and at higher pHs, e.g. 7–10, HOI is an efficient virucide. Chang (1) reports that above pH 8, HOI decomposes slowly to form iodide and iodate ions, especially in the presence of dissolved iodides. Neither iodides nor iodates have been found to be germicidal. Further, $I^-$ reacts with $I_2$ to form the highly coloured $I_3^-$ ion, which is also ineffectual as a germicide.

Various tinctures of iodine may be generated upon dissolving the solid in organic liquids such as ethanol, acetone, diethyl ether, toluene, p-xylene, benzene and carbon disulphide. Additionally, many organic preparations of iodine may be generated by reacting appropriate organics with iodine, e.g., iodoform, methylene iodide. Among the most popular commercial iodine-organic complexes are the PVP-iodines, iodoforms and povidone-iodine preparations, which are used as detergents and antiseptics. Most of these compounds exhibit germicidal action upon dilution in water, whereupon the iodine is hydrated and released into the water, usually as molecular iodine. Many biocidal, organic iodine compounds are commonly referred to as iodophors.

Traditionally, iodine-bearing resins are made by attaching $I_2$, tri-, penta- and hepta-iodide ions to quaternary ammonium, styrene-divinyl benzene, cross-linked anion-exchange resins. Upon elution with water, the polyiodides and iodine are released from the resin via anion-exchange mechanisms. These resins are thought to operate on a demand-type basis, where iodine will only be released in the presence of a germicidal load in the water passing through the resins, by the following mechanisms; (1) iodine release aided by an internal exchange mechanism involving $I_2$ transfer through a polyiodide intermediate, (2) hydrolysis of iodine on the resin to produce HOI, (3) simple release of $I_2$ by the resin-polyiodide combination and/or organic resin matrix.

Disinfection of drinking water for farm animals, particularly, chickens and pigs raised under confined conditions represents a major problem owing to the contamination of the water throughout the entire distribution systems by common bacteria present in animal feces, such as *E coli*, other fecal coliforms and fecal streptococci. Both pigs and chickens spread the bacteria found in manure from barn floors to drinking vessels, which, in turn, leads to back-contamination of the entire water distribution infrastructure network and allows infection to spread from barn to barn. Further, seasonal variations in source-water bacterial levels have been found to contribute to infection of livestock.

The use of chlorine-based or iodophor products for the disinfection of farm animal drinking water is not very satisfactory and suffers from significant disadvantages.

The following lists show some of the many problems associated with using chlorine or iodophor products for water disinfection.

CHLORINE
- highly unstable with respect to composition of individual batch lots
- causes fatality if dosage exceeds 10–12 ppm
- gasses off at higher temperatures to generate toxic aerosols
- reacts with naturally occurring acids to form toxic by-products, for example, tri-halomethanes
- very sensitive to changes in pH and temperature and is only effective in narrow pH and temperature ranges
- moderately-to-highly corrosive depending on its concentration and chemical specification to damage distribution equipment and requires special handling
- requires careful pre-mixing, before distribution to livestock
- very high maintenance costs for distribution system, and liberates free chlorine gas upon exposure to most metals.

IODOPHORS
- high levels of phosphoric acid in most commercially available products causes burning of avian digestive tract which results in weight loss and/or fatality, as well as damage to metals and rubber seals within the distribution networks
- much more expensive than chlorine products owing to preparation and shipping costs
- sensitive to exposure to light and also photo-degradable
- biologically active only when mixed with water, if permitted to remain in prolonged storage, undiluted iodophor may develop infection by Pseudomonas spp. bacteria, and this infection can be passed on to animals resulting in infection of entire broods
- messy to handle
- dilution of raw iodophor must be strictly controlled in order to maintain proper levels of disinfection without poisoning livestock
- organic solvents permits moderate degree of gassing-off of iodine, In addition to the aforesaid disadvantages of existing disinfectants in the aforesaid farm animal drinking water, other industries and fields requiring the use of disinfectants are subject to similar disadvantages. Industries such as agriculture, fisheries, pharmaceutical, medical and dental field, ship ballast and cooling tower waters, industrial process water and sewage and waste water treatment all suffer from the inadequacies of existing disinfectants, such as chlorine and iodophor as hereinbefore described and quaternary ammonium compounds.

Accordingly, there is a need for a water treatment system which provides drinking water to farm animals through a distribution network by which bacterial levels can be efficaciously controlled and which reduces bacterial back-contamination and for an improved disinfectant for the aforesaid duties as hereinbefore listed.

SUMMARY OF THE INVENTION

It is an object of the present invention to provide apparatus and method for delivering disinfected drinking water in an accurate and safe manner.

It is a further object to provide said apparatus and method that reduces the amount of operator handling and risk of inaccurate delivery of the disinfectant species.

It is a further object to provide an efficacious method for controlling bacteria levels in the drinking water of livestock, particularly *E coli* in drinking water for chickens and pigs.

It is a further object to provide a source of disinfectant for the plurality of duties hereinbefore described.

Accordingly, the invention provides in its broadest aspect a method for producing bacteria-free iodine species-containing drinking water for farm animals under continuous dynamic water flow, comprising (a) dissolving solid iodine into a first water flow to produce a saturated iodine species-containing aqueous solution at a pre-selected temperature;

(b) blending said saturated solution with a second water flow to produce a diluted iodine species bacterium-free aqueous solution; and (c) providing said diluted solution as drinking water to said animals.

By the term "iodine-species" as used in this specification is meant, collectively, dissolved molecular iodine and hypoiodous acid species present within the pH range 5–8. The ppm concentrations herein refer to the concentrations of these species determined as free molecular iodine.

Preferably, the method as hereinabove defined comprises a method as defined in claim 1 comprising (a) selecting said pre-determined temperature for said saturated iodine species aqueous solution;

(b) passing said first water flow through said solid iodine at said pre-selected temperature to produce said saturated solution at a first water flow rate;

(c) blending said saturated solution at said first water flow rate to said second water flow having a second water flow rate such as to produce said diluted iodine-species bacterium-free aqueous solution at a pre-selected iodine-species concentration.

In a preferred embodiment the first water flow runs from and is subsequently returned after passing through the iodination system to the second (main) water flow as to constitute a loop network.

In an alternate embodiment the first flow constitutes a water feed line not led off the main flow wherein feed water to an iodine generator is fed from a distinct water source, having a first flow rate controlled by an independent valve. After passing through the iodine generator assembly it is blended with the main flow as hereinabove defined.

Thus, in its broadest aspect the invention provides a dynamic water flow process for providing bacterium-free, iodine species-containing drinking water for livestock at constant, safe, efficacious bacterial levels.

Most preferably, the process of the invention provides a means of maintaining the constant iodine species levels in the drinking water by adding the selected amount of saturated iodine species solution to the main flow at desired flow rates, wherein the saturated solution levels in the iodine generator are set by the selected temperature of the saturated solution. This is preferably achieved by measurement of the temperature of the iodinated solution and subsequent of the temperature to the desired pre-selected valve by heating means, in consequence of instructions from a central control system.

Accordingly, the method as hereinabove defined further comprises a dynamic method as defined in claim 4 further comprising (a) measuring the temperature of said first water flow by temperature measuring sensing means to determine the temperature of said first water flow; and (b) raising the temperature of said first water flow by said heating means in consequence of said temperature measurement to heat said first water flow to said pre-determined temperature.

The method thus can readily provide a continuous dynamic flow of iodine species-containing drinking water having any desired concentration of 1–15 ppm., preferably 2–5 ppm. Volumes ranging up to 50 l. per minute can be readily provided with two iodine canisters linked in series in the generator assembly, providing up to 1 l. per minute depending on the water temperatures selected.

In a further broad aspect, the invention provides an apparatus for producing bacterium-free, iodine species-containing drinking water for farm animals under dynamic water flow comprising (a) means for providing a first water flow;

(b) mixing means for effecting the dissolution of solid iodine into said first water flow to produce a saturated iodine species containing aqueous solution at a pre-selected temperature;

(c) means for providing a second water flow; and (d) means for mixing said saturated aqueous solution with said second water flow to produce a diluted iodine species-containing bacterium-free aqueous solution; and (e) means for providing said diluted solution as drinking water to said animals.

Preferably, the apparatus further comprises an apparatus as defined in claim 14 further comprising (a) temperature sensing means for measuring the temperature of said first water flow;

(b) heating means for heating said first water flow (c) control means for receiving said temperature measurement and instructing said heating means to heat said first water flow to said pre-selected temperature in consequence of said temperature measurement More preferably, the mixing means comprises an iodine generator having a housing containing the crystalline iodine. Yet more preferably, the iodine generator assembly has a plurality of individual generators, preferably two, linked in series. Each of the individual canisters preferably has means for heating the water passing therethrough, with the final canister having a temperature sensing probe which is connected to a central control.

Table 1 shows the efficacy of elemental iodine against *E coli* and other enteropathogenic organisms commonly associated with livestock. *E coli* is effectively killed by 1–10 ppm. The Canadian government has approved the use of up to 14 ppm of "iodine" for the disinfection of drinking water for livestock. The $LD_{50}$ of iodine in chickens is about 625 ppm. We have demonstrated that chickens could safely consume residual iodine at concentrations of about 2 ppm. The system of the invention is capable of delivering preselected variable amounts of iodine in the very useful 1 to 15 ppm range which enables the method of the invention to be adjusted according to seasonal and other unforeseen changes in bacterial levels in the farm water distribution network.

TABLE 1

| Authors | Pathogen | T(C.) | Contact Time | ($I_2$) | | % Kill |
|---|---|---|---|---|---|---|
| Black et al., 1968 | *E. coli* fecal streptococci | 18 C. | 1 min | 0.5 | ppm | 99.99 |
| Chang et al., 1953 | *E. coli* | 25 C. | 5 min | 7 | ppm | 99.99 |
| Ellis et al., 1989 | *E. coli* fecal streptococci | 20 C. | 30 min | avg.4 | ppm | 99.99 |
| Ellis et al., 1993 | *E. coli* | 5–35 C. | 30 min | 1–10 | ppm | 99.99 |
| Hsu et al., 1966 | *E. coli* | 37 C. | <1 min | 8 | ppm | 99.99 |

The present invention overcomes the bacterial problem in inherent drinking water for livestock by providing a metered amount of iodine species to the water distribution network such that: (a) the level of iodine is sufficiently high to kill the bacteria without being so high as to kill livestock, and (b) by provide the metering of the biocidally-effective levels of iodine in a safe, controlled and consistent manner.

The present invention further provides an improved general disinfectant produced by a method as hereinabove defined for use in the following duties.

The process and apparatus as hereinabove defined may be used to continuously produce iodine species-containing aqueous solutions of preferably up to 300 ppm iodine, for subsequent dilution to lower concentrations, generally, less than 20 ppm and preferably 2–10 ppm.

The diluted solutions may be used for the following purposes, either as liquid or as frozen or partially-frozen iodine species-containing ice/water, optionally including brine compositions.

Such diluted compositions may be used as a general disinfectant, as metered dosages of iodine, for example, for duties such as, surface disinfectant in food processing, medical environments, dental offices;

equipment disinfectant in food processing, medical environments, dental offices;

hand wash in food processing, medical environments, dental offices;

foot bath in processing industries;

conveyor belts;

industrial/commercial cooling tower water to adequately disinfect the cooling water prior to discharge or reuse;

carcass wash equipment for meat, poultry and fish with no iodine uptake into the flesh in the food processing industry, to enhance the shelf life of fresh food;

fruit and vegetable wash equipment whereby the disinfection of fruits and vegetables prior to shipping for local or export markets is necessary in most countries around the world;

close loop water recirculation systems in vehicle and other equipment for the transportation of live marine animals and fish and in aquaculture. The iodine species-containing solutions of the invention are provided in controllable specific dosages for both micro-nutrient and disinfection needs;

water chemistry adjusters and post filters to supply microbially safe iodine-free drinking water and to deliver safe drinking water through disinfection and concurrently deliver iodine as a human micro-nutrient to combat Iodine Deficiency Disorder presently affecting millions of people, globally. It may, optionally, be used on a large scale in conjunction with chlorine to create a dual halogen effect for disinfecting drinking water;

deliver specific metered dosages of iodine through a watering system to be used as a soil disinfectant, herbicide and to enrich iodine deficient soil, to address vegetable iodine uptake as well as microbial control in the soil;

specific metered dosages of iodine to aerosol spraying systems for misting livestock during warm weather and fruits and vegetables during transportation and presentation;

to provide metered dosages of pure, elemental iodine in the manufacture of pharmaceuticals;

as an essential iodine additive to most commercial feeds to eliminate the associated costs of the carrier molecule for the iodides as presently used;

for use as iodine containing disinfectant in industrial process water in cooling canals for canned fruits and vegetables and the movement of fish by means of water canals throughout a processing plant or a final rinse in a fresh fruit or vegetable wash canal;

iodine as the sole disinfectant that can control microbes without damaging marine life and, thus, the iodine species-containing water can disinfect ballast water prior to dumping to avoid problems, such as the introduction of Zebra mussels, in consequence of ships carrying contaminated water from one port with subsequent dumping in another port;

as a micro-nutrient for human, animal livestock, fish and plants which require iodine in their diets to sustain growth and good overall health. Present vehicles of delivery for iodine to humans is iodized salt and for livestock animals and fish it is added to their feed as a form of iodide by the spraying or irrigation of plant for them to retain the iodine and pass it on through the food chain in iodine deficient areas of the world. In the case of fish it can be put in feed and or added to the water supply. The system can deliver required metered dosages for human consumption, added to livestock feed during preparation and in the water for marine life;

as an egg wash wherein the movement of commercial eggs often requires disinfection of the egg, and in the case of fish a disinfectant during hatching to reduce mortality.

as an iodine source as a disinfectant in packaged and industrial ice wherein there is presently no disinfectant grade ice product available. Chlorine escapes through the crystal lattice of the ice and iodophor has limited opportunity for success due to the chemical by-products in the iodophor matrix. The system of the invention can provide metered specific dosages of iodine to water supplies feeding all types of ice machines. Different dosages and different ice types are required in the various ice applications. There is no significant iodine uptake by fish fillets in contact with iodinated ice or the resultant melt water;

in sewage and waste water treatment.

Most of the above applications are provided to substitute for the disadvantageous use of chlorine or iodophor disinfectants, or where at present there is no use by any disinfectant.

Accordingly, in a further aspect the invention provides iodine species-containing water prepared according to the invention as hereinabove defined for use in the aforesaid applications.

BRIEF DESCRIPTION OF THE DRAWINGS

In order that the invention may be better understood, a preferred embodiment will now be described by way of example with reference to the drawings wherein.

DETAILED DESCRIPTIONS OF PREFERRED EMBODIMENTS

Figure 1:
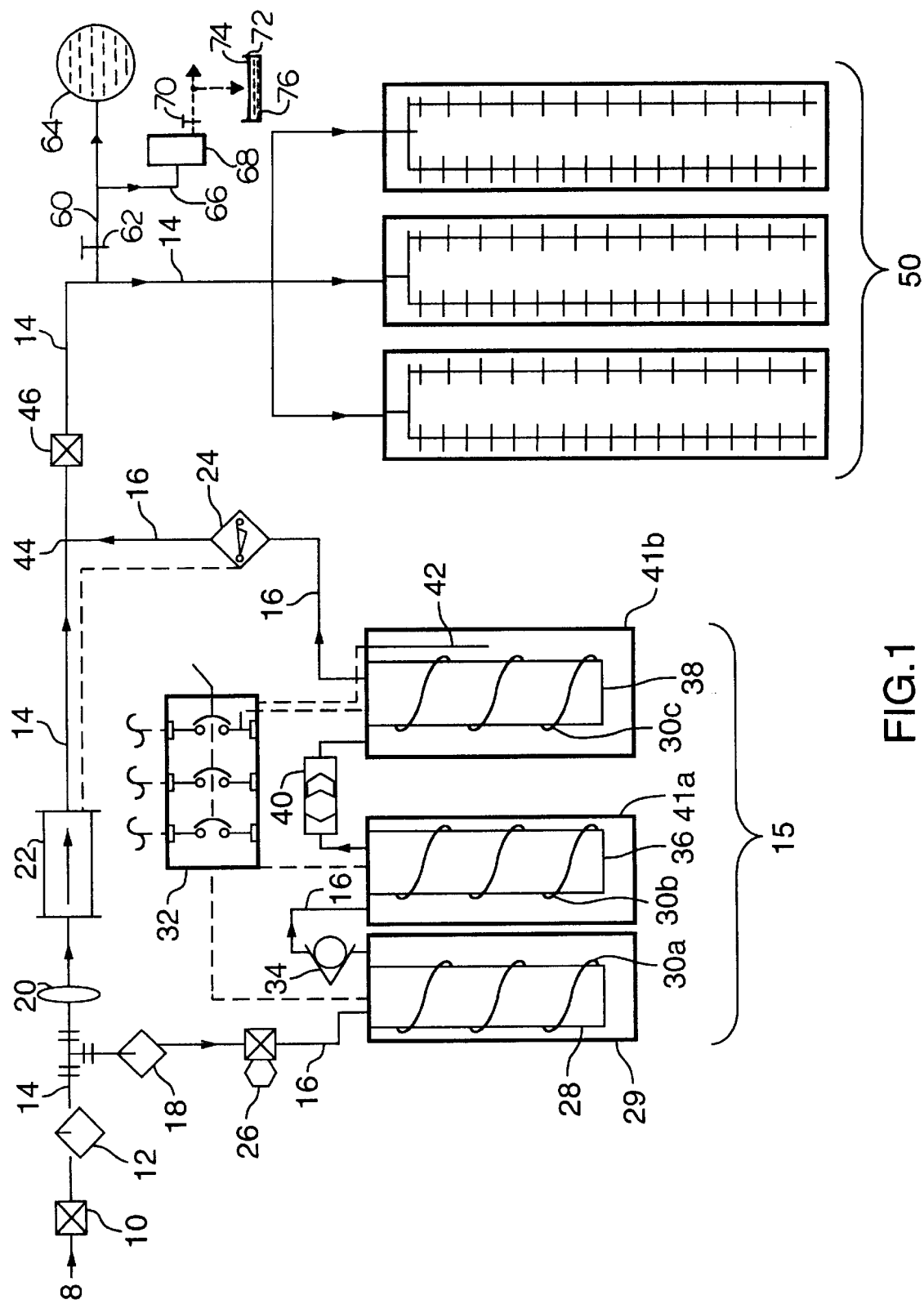
FIG. 1 represents a schematic flow diagram of a method and apparatus according to the invention.

With reference to FIG. 1, the apparatus distribution network and method embodied therein is shown generally as 2 and comprises a water feed conduit 8, which feeds inlet water through a shut-off valve 10 to a preconditioner 12. The incoming water is, typically, an untreated artesian source, hereinafter referred to as the "main flow" which enters the system at, typically, ambient temperature, e.g. 4–18° C. However, network 2 is designed to also accept water at other temperatures of between 0°–40° C. Preconditioner 12 is a preferred optional feature and contingent upon the quality and chemistry of the source water and may include pre-filters, water softeners or pH adjustor media. Incoming main flow water after leaving preconditions 12 is preferably in the 6–8 pH range.

Main flow water exits preconditioner 12 and the majority which passes through network 2 through conduit 14, hereinafter referred to as the "main line". A minor portion of this water is fed to an iodine generator assembly shown generally as 15 to generate a saturated iodine solution through branch conduit 16, off conduit 14, into an optional particle filter 18. Filter 18 removes detritus in the flow proceeding through conduit 16 so as to prevent the clogging and fouling of the downstream part of the system, especially the fouling of crystalline iodine present in downstream portions of the network. Conduit 16 has an inner diameter approximately ¼ to ⅛ that of main line 14 owing to the lower relative flow rates required through conduit 16. Conduit 16 and the network downstream is described hereinafter.

The network is designed to accept incoming water pressures of between 40 psi and 100 psi such that at a minimum operating condition more than 2 l. per minute passes through main line 14 and such that the absolute pressure drop across a flow-restrictor disk 20 across line 14 will be about 2 psi. Flow-restrictor disk 20 is a round, 1.5 mm inch thick slice of PVC plastic which has been machined to fit into a modified plastic union. Disk 20 itself has an opening in its centre of about 6 mm., such that a pressure drop of about 2 psi is generated across the disk orifice as water passed through it. After flow-restrictor disk 20 is a pre-set flow switch 22, which is self-activated when the flow in main line 14 exceeds 2 l. per minute. The preferred maximum attainable flow rate through main line 14 is about 50/l per minute, and the minimum flow rate is slightly greater than 2 l. per minute. Flow switch 22, upon experiencing flow rates greater than 2 l. per minute generates an internal electrical impulse which is transmitted to a dual-action electrical solenoid valve 24, present at the back end of the iodine generator assembly described hereinbelow. When solenoid 24 receives an impulse that the flow rate exceeds 2 l per minute, it opens and allows saturated iodine liquor generated as hereinafter described to flow into main line flow conduit 14. The control system for the metering of saturated iodine solution into main line 14 is discussed hereinbelow. If the flow rate does not exceed 2 l. per minute, flow switch 22 does not generate the electrical impulse required to open solenoid valve 24, and solenoid 24 will remain closed. In this manner, at flow rates less than 2 l. per minute, no iodine solution passes into main line 14. Flow switch 22 can be set to accept any desired flow rate, and need not be restricted to 2 l per minute. The purpose of having solenoid valve 24 in this particular location within the system is to prevent the leakage of any iodine into the main flow in the event the above mentioned flow condition criteria are not met, i.e. in the event that the flow within the main line does not exceed 2 l per minute. Also, solenoid valve 24 is such that, if power to the solenoid itself fails, or if the flow switch malfunctions, it will shut completely and, thus, cut off any iodine from reaching the main flow. Using a solenoid here is the best way to insure absolute control of allowing or disallowing iodine to flow from the iodine generation loop into the main flow, and therefore provides a useful safety feature, required to prevent the accidental overdosage of iodine in the event of a power failure or other related system failure. Whether present in this particular configuration, or as a non-electrical device it is desirable to place a check valve or solenoid at this location within an embodiment of the present invention. However, untreated source water is still allowed to flow to the livestock at the terminal end of conduit 14. Flow switch 22 only controls solenoid valve 24 and does not effect the flow of water through conduit 14.

After passing through filter 18, water in conduit 16 flows through an adjustable needle valve 26 which can be adjusted manually to deliver a selected variable amount of water over a given time period to iodine generator assembly 15. Typically, valve 26 is adjusted such that about 100 ml to 300 ml per minute is delivered into assembly 15 to produce an equal amount of saturated iodine liquor to be subsequently delivered into main flow 14 through solenoid valve 24. Thus, needle valve 26 controls the gross quantity of saturated iodine liquor produced within iodine generator assembly 15 and is adjusted according to the specific needs of each user, but is capable of delivering up to about 10 ppm to 12 ppm in the embodiment herein described.

In more detail, after passing through needle valve 26, water continues through conduit 16 into a carbon filter cartridge 28 to remove unwanted halogens, trihalomethane and organic residuals. Carbon filter cartridge 28 has a PVC housing 29 and a heating element 30a, which serves, initially, to warm the incoming water before it reaches iodine reservoirs 36, 37. Heating element 30a is wound around carbon filter cartridge 28 such that the temperature of the element never reaches a temperature high enough to damage any of the plastic components it touches. The temperature of heating element 30a is regulated by a central temperature controller 32 by means of an electrical connection 31.

Conduit 16 continues between carbon filter cartridge 28 and a first iodine generator 36 after first passing through a PVC-diaphragm one-way check valve 34, which permits flow of water through conduit 16 in the downstream direction only. Conduit 16 continues to a second iodine generator 37. Thus, iodine generators 36 and 38 are linked in series and each comprises a PVC canister containing crystalline iodine water-entry and liquor-exit holes (not shown) and housing 41a and 41b, respectively. Heating elements 30b and 30c are present in-the respective housings of iodine generator 36 and 38 to further warm the water during its passage through the iodine generator 15 assembly. Heating elements 30b and 30c are also regulated by central temperature controller 32. After passage through generator 36, the resultant iodine aqueous solution is referred to as "iodine concentrate" and proceeds through conduit 16 to second iodine generator 38 after first flowing through a sight glass 40, which comprises a clear, pressure-resistant tube and water-tight fittings, through which the concentrate may be viewed for the purpose of determining required recharge of first iodine generator 36. When sight glass 40 reveals clear, colorless water, a new iodine recharge is placed in the housing of first iodine generator 36.

Heating element 30c is present in second iodine generator 38 in order to further raise the temperature of the iodine concentrate to a pre-selected level. The temperature of the iodine concentrate is directly measured by a thermocouple 42 inserted into housing 41b and the reading sent to central temperature controller 32. By means of a feedback loop, central temperature controller 32 allows more or less current to reach each of the heating elements 30a, b, c such that the temperature of the saturated iodine concentrate leaving generator 38 at a pre-selected, desired value to provide a constant resultant concentration of outgoing "saturated iodine liquor". Central temperature controller 32 is capable of being programmed to accept a wide range of temperature setpoints, as would be determined for each application.

The housings are made of iodine resistant PVC, as are the iodine recharges or holders. Water is, preferably, made to flow through the iodine charges from bottom to top to insure maximum dissolution rates of the iodine.

The saturated iodine liquor flows through conduit 16 and solenoid valve 24, provided that the flow rate through conduit 14 criterion described hereinabove is met. It is blended back into main line conduit 14 at iodine injection port 44. As such, the "iodinated main flow" now flows through conduit 14, past a shut-off valve 46 and into a water distribution network shown generally as 50 in a given poultry or swine barn, where it is then consumed by the livestock from whichever type of drinker the farm uses. Any excess water passing through the network may be run off to drain.

The following example illustrates a typical process according to the invention using the apparatus described hereinabove.

Artesian water is fed through inlet conduit 8 past shut-off valve 10 through preconditioner 12 at a flow rate of not less than 2 l. per minute and not more than about 50 l. per minute preferably on average about 10 l. per minute at a pH 6–8, temperature 4–6° C. and pressure of 60 psi. Main flow water passes through conduit 14 where some of the main flow is diverted to iodine generator assembly 15 through conduit 16 at a flow rate of about 200 ml/minute. The rest of the main flow flows through flow restrictor disk 20 such that an absolute pressure drop of about 2 psi is generated across flow restrictor disk 20. Flow restrictor 20 governs the rate of flow of diverted main flow which ultimately reaches iodine generator assembly 15. The main flow now proceeds through flow switch 22, such that, at a pre-set flow rate exceeding 2 l per minute, the flow switch 22 generates an electrical impulse which is fed to dual action solenoid valve 24. Such an impulse is continuous and causes solenoid valve 24 to open and remain so, as long as the flow rate is maintained above 2 l per minute. The rest of the main flow continues through conduit 14 uninterrupted until iodine liquor is blended back into the main flow at iodine species liquor injection port 44.

The diverted flow derived from conduit 14 passes into conduit 16 owing to the pressure drop induced by flow restrictor disk 20 and passes through filter 18 to remove any large particulate matter before flowing through adjustable needle valve 26. After the appropriate flow adjustment has been made, manually, to insure the proper amount of saturated iodine solution is flowing into main line 14 from iodine generator assembly 15, the water in conduit 16 flows through carbon filter 28, where any residual organics are removed, and the water is heated to about 12° C. by heating element 30a, governed by central temperature controller 32. Controller 32 is pre-set to a given temperature, such that, by the time the iodine liquor emerges from the final iodine generator 38 it has achieved the same temperature as the pre-set setpoint programmed into the central temperature controller 32, for example, 28° C.

Filtered water passes through one-way PVC-diaphragm check valve 34, which prevents back-flow of any iodine concentrate or liquor generated downstream, and enters first iodine generator 36, where it is heated by second heading element 30b to a temperature of about 20° C. before passing through the actual crystalline iodine held within generator 36. Elemental iodine in generator 36 has a mass of about 1.0 kg, and is present as USP-Grade, solid flakes. The iodine species concentrate has a concentration of about 200–240 ppm at this stage.

After leaving first iodine generator 36, the iodine concentrate passes through sight glass 38 and enters second iodine generator 38, where it is heated to the pre-set temperature of about 28° C. before passing through an additional 1.0 kg of crystalline iodine held in iodine generator 38 wherein the resultant iodine liquor has a concentration of about 280–320 ppm. Thermocouple 42 senses the temperature of the iodine concentrate and the resultant signal is sent to controller 32, which in turn determines if the temperature of the iodine concentrate is at the pre-set setpoint, and causes the heating elements 30a, b, c to put out more heat if the temperature is too low, or to cycle on-and-off to maintain the status quo; at no time does controller 32 cause the concentrate to exceed the pre-set setpoint value.

After exiting second iodine generator 38, iodine liquor concentrate is blended back through conduit 16 into the main flow at iodine injection port 44 at an appropriate rate as determined by adjustable needle valve 26 as to generate sufficient aqueous iodine species for the production of a pre-selected final concentration of about 2 ppm to 3 ppm of free iodine in the blended main flow. The blended main flow proceeds past shut-off valve 46 through conduit 14 and is allowed to flow into various drinking vessels of farm water distribution network 50 to be consumed by livestock, particularly, chickens and pigs, such that a free residual of iodine is present to the end of the water distribution network of drinkers. This ensures disinfection along the entire distribution network and that the livestock can consume the desired level of iodine.

Thus, at flow rates greater than 2 l. per minute in the above embodiment, there will always be sufficient iodine species present in the drinking water of the farm network to prevent bacterial back-contamination. Higher concentration levels of iodine species in the animal drinking water may be selected and preset as desired, by means of controlling the temperature of the water in iodine generator assembly 15.

The solubility of crystalline iodine in water is directly proportional to the temperature of the water. To achieve the desired pre-selected level of iodine species concentration, accurate temperature control and flow rates of the water leaving the iodine generator assembly is required.

We have found that the thermocouple temperature sensor is most preferably located within the final iodine generator. We have also found that the desired temperature tolerances are so fine that if the sensor is placed in any other location in the water flow, the concentration of iodine is lower than ideal because the water within the generators warms up by several degrees in consequence of the ambient heat acting on the generators and given that water within the generators flows at relatively low flow rates (e.g. 100–300 ml/min).

The temperature within the barn environment is subject to relatively large fluctuations based on the season and the heat produced by the livestock themselves, such that the ambient temperature within the barn might reach 27° to 30° C. in the summer and to less than 10° C. in the winter.

Further, we discovered that use of commercially available electric solenoid valves to control the amount of iodine concentrate injected into the main line under the influence of a thermocouple reading the water temperatures in the iodine generator assembly were not sensitive enough for satisfactory control of the amounts of saturated iodine liquor added to the main flow. The solenoids per se were unable to adequately provide accurate and consistent adjustment of the iodine concentrate flows into the main flow.

One preferred embodiment of the present invention uses a manually controlled needle valve to adjust the amount of iodine concentrate added to the main flow, which needle valve has a preset setting related to the desired pre-set and constant temperature of the iodine concentrate leaving the generator assembly.

Thus, a preferred aspect of the present invention provides a method which effectively eliminates temperature as a difficult-to-control variable, by maintaining the temperature of the iodine concentrate constant at a pre-selected value. This is preferably effected by the use of heating elements inserted directly into the generator or assembly. In this manner, water emerging from the generator assembly is at a constant temperature of, say, about 28° C. Therefore, the concentration of iodine is maintained constant and at a saturated level, regardless of the temperature of either incoming main water flow or of temperature fluctuations within the barn/installation environment itself. Thus, use of a thermocouple inserted in the generator assembly to monitor the temperature of the iodine concentrate, and to control the heaters using a feedback loop embedded in the central temperature controller provides the desired control. The central temperature controller is a commercially available device distributed by Watlow Ltd. and comprises a plastic body housing several computer components programmed to accept ranges of setpoint values and PID control loops. The controller is equipped with fail-safe features, including the ability to lock-out any unwanted adjustment, such that inadvertent changes are impossible to make.

A preferred embodiment of the invention involves the flow of a portion of the main water into the minor secondary line originating from the main line via hydraulically coupling the two lines, i.e. by causing a pressure drop to exist at some point between the places where the secondary line departs the main line and the place where the secondary line rejoins the main line from the main line itself, some water is made to flow into the secondary line in a controlled fashion, such that the rate of flow is proportional to the pressure drop induced across the coupling and to the size of any restricting aperture, therefore, which exits within the main line to cause the pressure drop. The pressure drop and subsequent flow rates depend upon the relative diameters of the main and secondary lines, respectively.

Use of a "shunt" ball valve having internal seal-rings can control the amount of back-pressure generated within the main line to control the amount of water able to flow through the iodine generators. At a desired flow rate of between 2–40 l. per minute, a pressure drop of about 2 psi is generally required to achieve the hydraulic coupling of the iodine generators to the main line, i.e. at pressure drops across the main line of less than 2 psi, no appreciable iodine is generated. The valve aperture in the "shunt valve" used to effect the pressure drop is subject to expansion and contraction owing to temperature changes of both the surrounding atmosphere and the water in the main line. These physical changes in the apertures may cause small but significant changes in the pressure drop across the shunt valve, and therefore change the amount of iodine produced by the iodine generators.

Preferably, a union formed of a plastics material to hold a machined shunt disk having a specific aperture width, determined by trial and error, to produce the desired pressure drop significantly reduces variable pressure drops across the system.

To prevent unwanted discharge of iodine concentrate into the main line, a PVC-diaphragm check value is inserted preferably between the main flow and iodine generator assembly. However, most preferably an electrical dual-action solenoid activated by a flow switch incorporated into the main-line flow is able to effectively stop migration of iodine into the main line under conditions of no-flow, because it acts under the influence of a signal from the flow switch to be either fully open, regardless of back pressure (the minimum flow criterion notwithstanding) or to be fully closed. Therefore seepage of iodine by diffusion is not an issue, as with the PVC-diaphragm check valve alone.

We have found that to ensure that there is delivery of the correct amount of iodine into the main flow, preferably a plurality of iodine cartridges, most preferably two canisters in the generator assembly are used.

Owing to pressure-drop and flow-rate constraints, the length of the iodine cartridge and the mass of iodine contained therein is generally important for the ready generation of saturated iodine liquor at the selected temperature levels. To avoid fouling of the iodine crystals, a particle/chemical removal filter is installed ahead of the crystals, such that the flow-restriction characteristics of the filter has minimal effect on the pressure drops across the iodine generator. Two iodine generators are preferably used instead of one, because in only using one generator, a risk exists of not generating sufficiently high concentrations of iodine in the liquor. The first generator serves to provide the bulk of the iodine concentrate, whereas the second iodine generator provides any small increment of iodine needed to achieve saturation of the liquor, as well as serving as a backup for the first generator as the iodine in the first generator is consumed. Preferably, the incoming water flows from the bottom of the cartridge through to the top in contrast to commercial cartridges, which operate in an opposite manner. This modification enhances the dissolution of the crystalline iodine and allows the production of an iodine-saturated concentrate on a consistent basis, without having to worry about consistency of batch lots of chemicals, as is the case with using iodophors or hypochlorite solutions.

Figure 2:
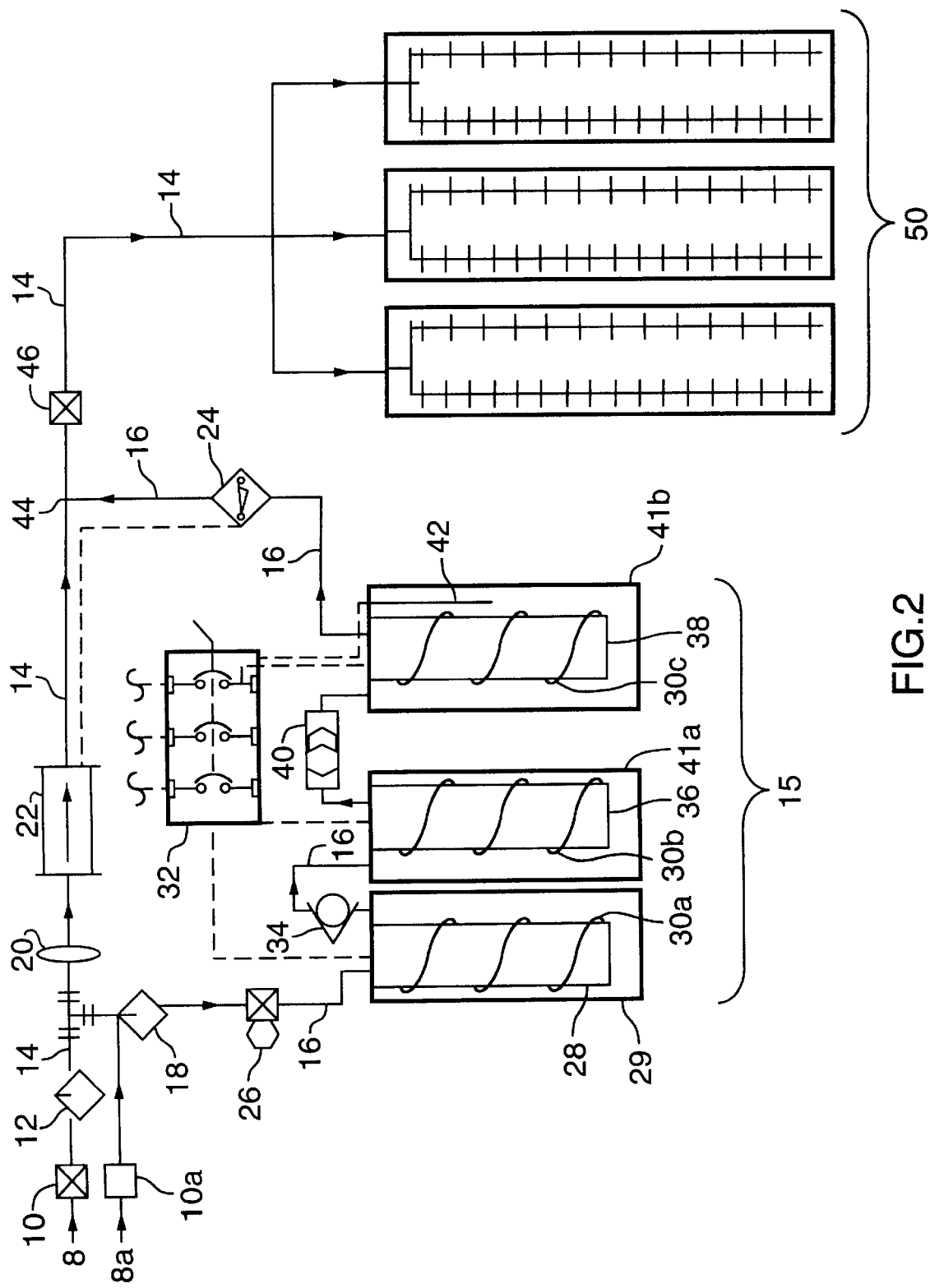
FIGS. 2, 3 and 4 represent schematic flow diagrams of alternative methods and apparatus according to the invention; and wherein the same numerals denote like parts and dotted lines denote electrical connections.

With reference now to FIG. 2, this shows an alternative embodiment wherein water is fed to line 16 from external water line 8a, through shut-off valve 10a.

Figure 3:
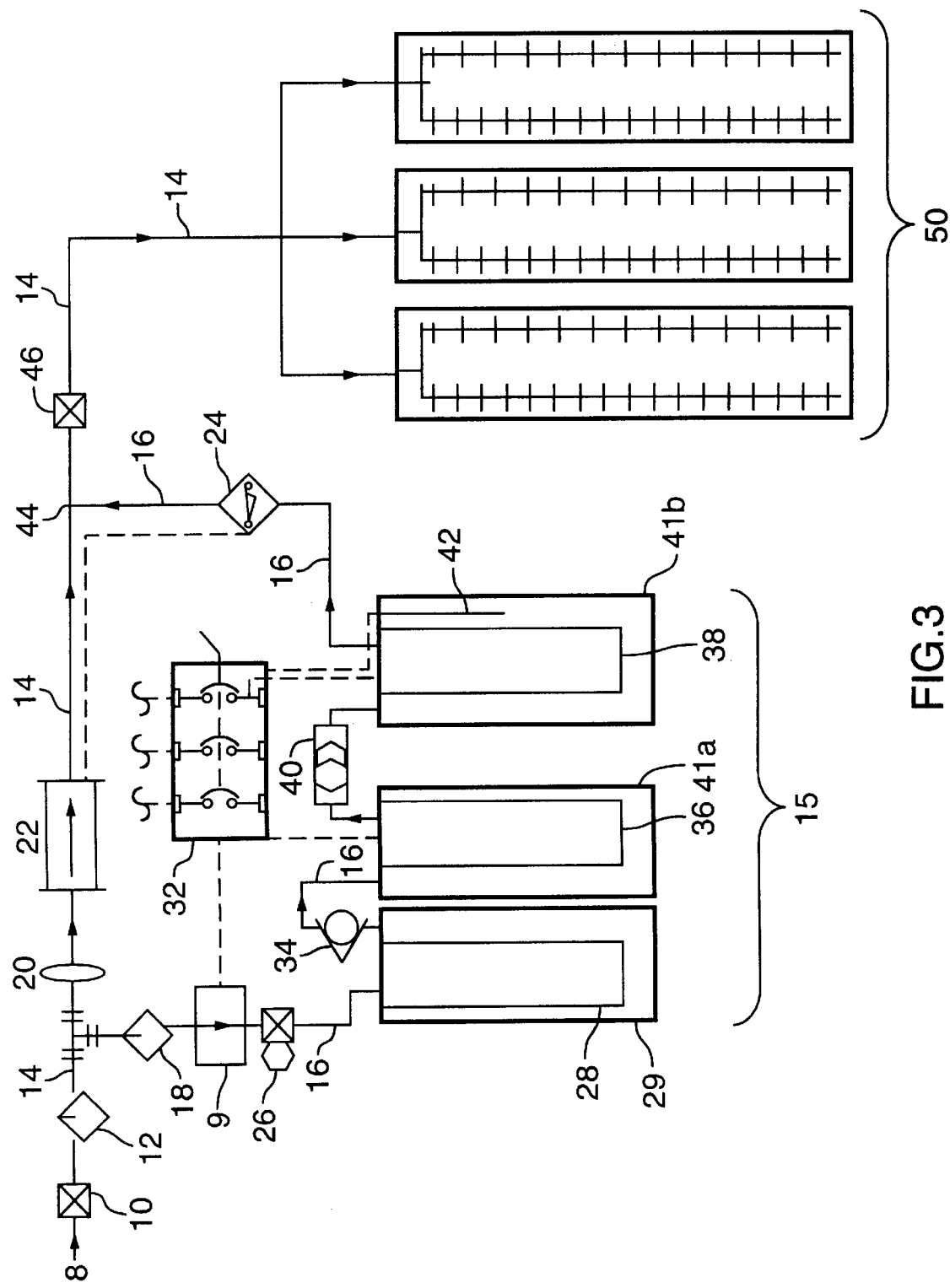
Figure 4:
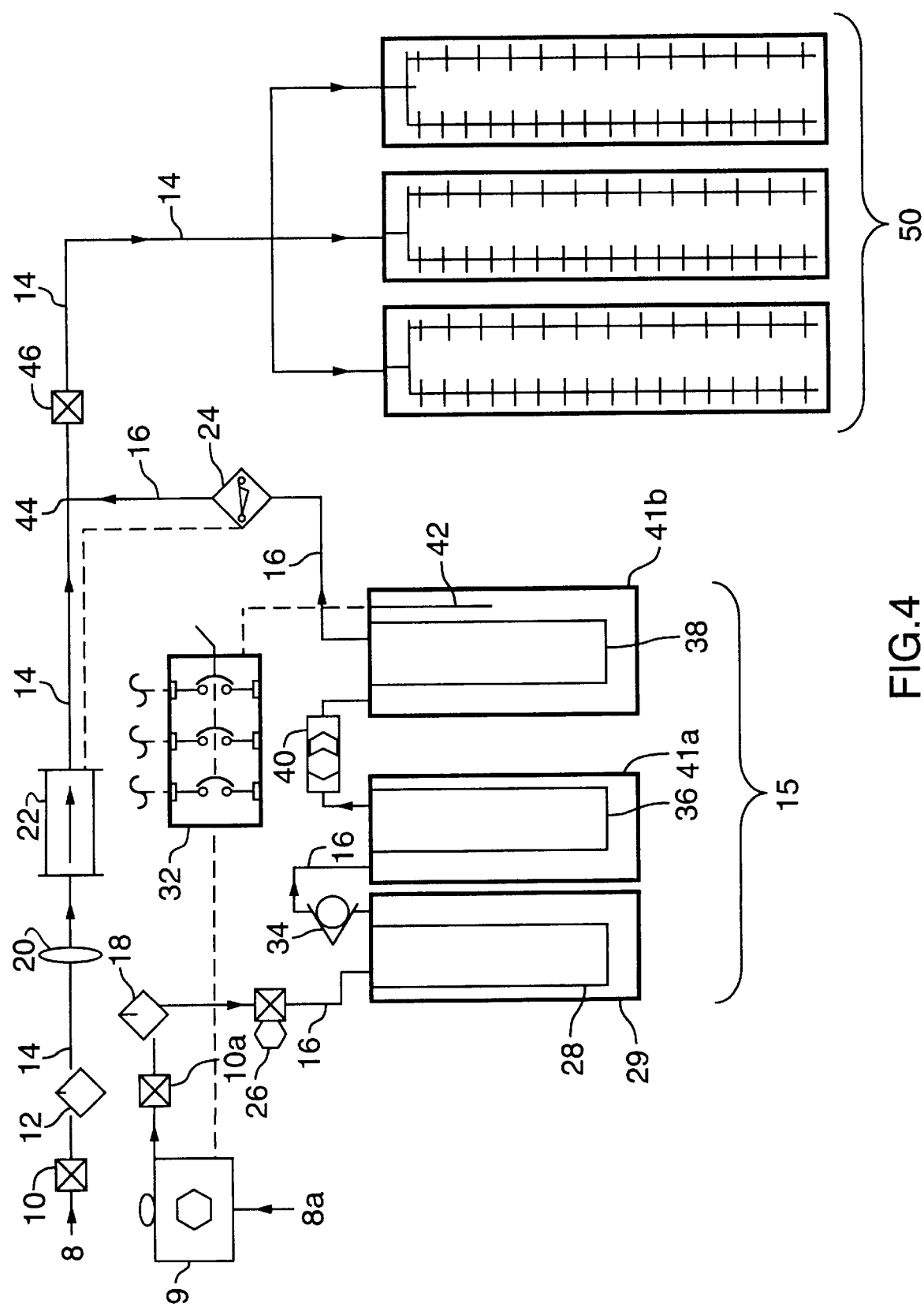

FIGS. 3 and 4, respectively, are analogous to FIGS. 1 and 2 but wherein water fed through conduit 16 is pre-heated to a pre-determined temperature prior to entering the iodine generator assembly 15, by means of water heater 9.

With reference further to FIG. 1, this shows an off-shoot conduit 60 having a flow control valve 62 and which feeds diluted iodine species-containing water to a fish pond or other aquatic farm holding system 64.

As an off-shoot from conduit 60 is a side conduit 66 leading to a holding tank 68 from which the iodinated water is fed through valve 70 for transportation for use in duties as a disinfectant or iodine nutritional source as hereinabove described, e.g. a container 72 holding an ice/iodinated water slurry 74 to preserve fish 76.

Although this disclosure has described and illustrated certain preferred embodiments of the invention, it is to be understood that the invention is not restricted to those particular embodiments. Rather, the invention includes all embodiments which are functional or mechanical equivalence of the specific embodiments and features that have been described and illustrated.

We claim:

1. A method for producing bacteria-free iodine species-containing water under continuous dynamic water flow, comprising
   (a) selecting a pre-selected temperature;
   (b) heating a first water flow to said pre-selected temperature;
   (c) providing solid iodine;
   (d) passing said first water flow at a first flow rate through said solid iodine to dissolve said solid iodine into said first water flow to produce a saturated iodine species containing aqueous solution at said pre-selected temperature; and
   (e) blending said saturated solution with a second water flow to produce a diluted iodine species bacterium-free aqueous solution.

2. A continuous method as defined in claim 1 wherein said first water flow and said second water flow emanate from a common water flow such that flow of said first water flow from said common water flow to said second water flow constitutes a loop flow wherein said first water flow is a first portion of said common flow and said second water flow is a second portion of said common flow.

3. A continuous method as defined in claim 1 wherein said dissolution of said solid iodine into said first water flow is carried out in an iodine generator comprising a housing retaining said solid iodine and passing said first water flow through said housing.

4. A continuous method as defined in claim 3, wherein said generator further comprises heating means for heating said first water flow to said pre-selected temperature.

5. A continuous method as defined in claim 4 further comprising
   (a) measuring the temperature of said first water flow by temperature measuring sensing means to determine the temperature of said first water flow; and
   (b) raising the temperature of said first water flow by said heating means in consequence of said temperature measurement to heat said first water flow to said pre-determined temperature.

6. A continuous method as defined in claim 3 wherein said dissolution of said solid iodine is carried out in a plurality of said iodine generators linked in series.

7. A continuous method as defined in claim 1 further comprising passing said diluted iodine species bacterium-free aqueous solution through a conduit network.

8. A method as defined in claim 1 further comprising:
   (a) controlling said first water flow rate in consequence of said pre-selected temperature to produce said saturated iodine-species aqueous solution;
   (b) adjusting said second water flow rate relation to said first water flow rate to produce said diluted aqueous bacterium-free solution having a pre-selected iodine species concentration.

9. A method as defined in claim 8 wherein said pre-selected iodine species concentration of said diluted solution is selected from 1–15 ppm.

10. A method as defined in claim 1 wherein said first water flow rate is selected from 0.1–0.5 l. per minute and said second water flow rate is selected from 2–50 liters per minute.

11. A method for producing bacteria-free iodine species-containing drinking water for humans, farm animals or fish under continuous dynamic water flow, comprising
   (a) selecting a pre-selected temperature;
   (b) heating a first water flow to said pre-selected temperature;
   (c) providing solid iodine;
   (d) passing said first water flow at a first flow rate through said solid iodine to dissolve said solid iodine into said first water flow to produce a saturated iodine species containing aqueous solution at said pre-selected temperature; and
   (e) blending said saturated solution with a second water flow to produce a diluted iodine species bacterium-free aqueous solution;
   (f) providing said diluted solution as bacterium-free drinking water to humans, farm animals or fish.

12. A continuous method as defined in claim 11 wherein said first water flow and said second water flow emanate from a common water flow such that flow of said first water flow from said common water flow to said second water flow constitutes a loop flow wherein said first water flow is a first portion of said common flow and said second water flow is a second portion of said common flow.

13. A continuous method as defined in claim 11 wherein said dissolution of said solid iodine into said first water flow is carried out in an iodine generator comprising a housing retaining said solid iodine and passing said first water flow through said housing.

14. A continuous method as defined in claim 13, wherein said generator further comprises heating means for heating said first water flow to said pre-selected temperature.

15. A continuous method as defined in claim 14 further comprising
   (a) measuring the temperature of said first water flow by temperature measuring sensing means to determine the temperature of said first water flow; and
   (b) raising the temperature of said first water flow by said heating means in consequence of said temperature measurement to that said first water flow to said preselected temperature.

16. A continuous method as defined in claim 13 wherein said dissolution of said solid iodine is carried out in a plurality of said iodine generators linked in series.

17. A continuous method as defined in claim 11 further comprising passing said bacterium-free drinking water through a conduit network to a plurality of animal drinking troughs.

18. A method as defined in claim 11 further comprising:
   (a) controlling said first water flow rate in consequence of said pre-selected temperature to produce said saturated iodine-species aqueous solution;
   (b) adjusting said second water flow rate relation to said first water flow rate to produce said diluted aqueous bacterium-free solution having a pre-selected iodine species concentration.

19. A method as defined in claim 18 wherein said pre-selected iodine species concentration of said diluted solution is selected from 1–15 ppm.

20. A method as defined in claim 11 wherein said first water flow rate is selected from 0.1–0.5 liters per minute and said second water flow rate is selected from 2–50 liters per minute.

* * * * *